United States Patent [19] | [11] Patent Number: 4,457,203
Schoenberg et al. | [45] Date of Patent: Jul. 3, 1984

[54] SOUND SIGNAL AUTOMATIC DETECTION AND DISPLAY METHOD AND SYSTEM

[75] Inventors: Steve A. Schoenberg, Clifton Park; David G. Ellis, Ballston Lake; Jesse Aronstein, Poughkeepsie, all of N.Y.

[73] Assignee: Wright-Malta Corporation, N.Y.

[21] Appl. No.: 356,501

[22] PCT Filed: Jul. 15, 1980

[86] PCT No.: PCT/US80/00873

§ 371 Date: Mar. 9, 1982

§ 102(e) Date: Mar. 9, 1982

[87] PCT Pub. No.: WO82/00379

PCT Pub. Date: Feb. 4, 1982

[51] Int. Cl.[3] .................... G10G 7/02; G09B 15/02

[52] U.S. Cl. .............................. 84/454; 84/477 R; 324/79 D

[58] Field of Search .................... 84/454, 1.01, 1.28, 84/453, 462, 477 R, 478, DIG. 29; 324/77 A, 79 R, 79 D; 307/525, 526; 328/133, 149; 364/484, 571

[56] References Cited

U.S. PATENT DOCUMENTS

| | | | |
|---|---|---|---|
| 3,812,432 | 5/1974 | Hanson | 328/149 |
| 4,122,751 | 10/1978 | Calvin | 84/454 |
| 4,227,437 | 10/1980 | Inloes et al. | 84/454 |
| 4,256,008 | 3/1981 | Ryon | 84/454 |
| 4,273,023 | 6/1981 | Mercer | 84/454 |

*Primary Examiner*—E. A. Goldberg
*Assistant Examiner*—Todd E. DeBoer
*Attorney, Agent, or Firm*—Charles W. Helzer

[57] ABSTRACT

A sound signal automatic detector used in a system with a micro computer and display for automatically detecting an input sound wave, computing from the detected sound wave the fundamental frequency of the sound and displaying its value in a number of different formats. The sound signal detector requires no attention on the part of a musician or other user while it is in operation and comprises a sound signal transducer supplying an amplifier having audio frequency bandpass characteristics compatible with the sound signal frequency spectrum over which sound signals to be analyzed extend. The bandpass characteristics of the amplifier preferably are defined by a high pass filter stage followed by an automatic gain control amplifier that in turn is followed by two stages of low pass filtering. The low pass filter stages supply their output to an alternate positive peak voltage and negative peak voltage detector circuit that functions to derive an output signal which is representative of the fundamental frequency of a input sound wave being analyzed. The output from the automatic detection circuit is supplied to a micro computer which then processes the signal and derives a number of different display formats for use by an instrumentalist, vocalist, or other musician or like person producing the sound for analysis and instruction purposes.

38 Claims, 16 Drawing Figures

ALTERNATE PEAK DETECTOR

Fig. 3B
Fig. 3C
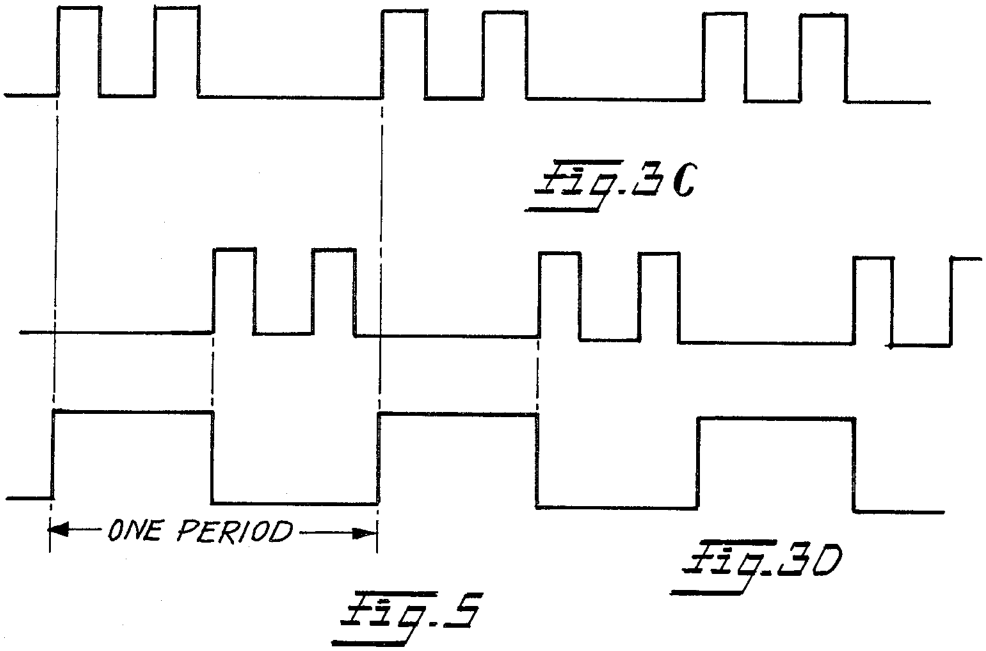
Fig. 3D
Fig. 5
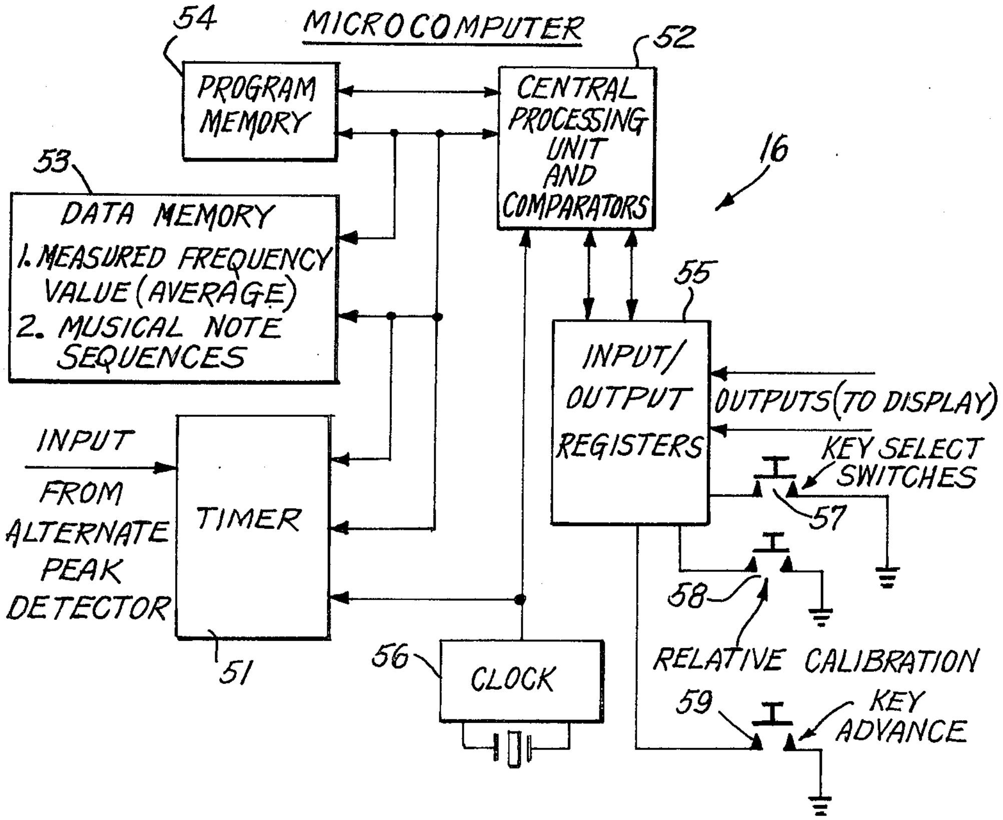

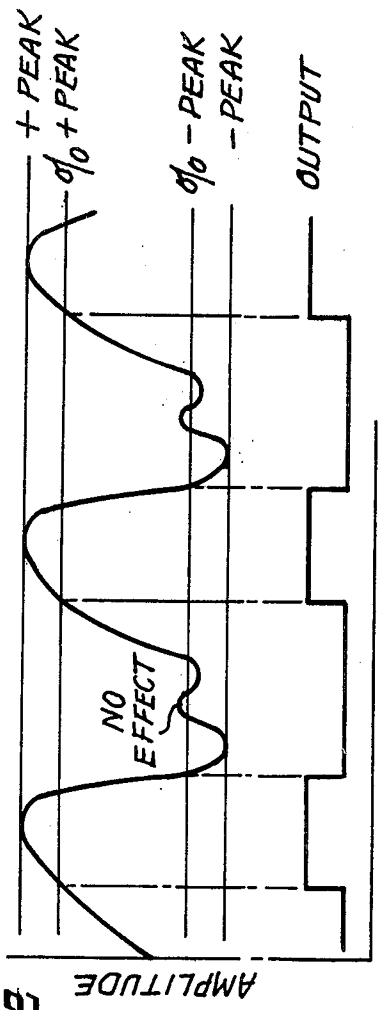
FIG. 12A
FIG. 12
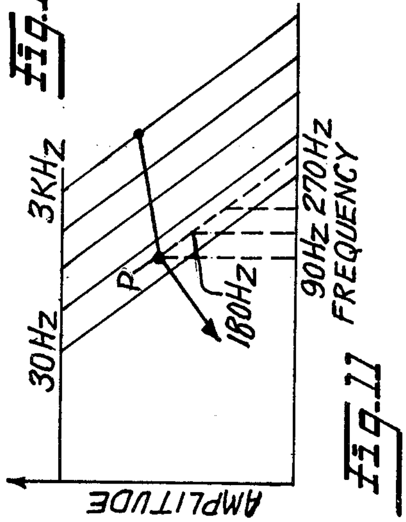
FIG. 11
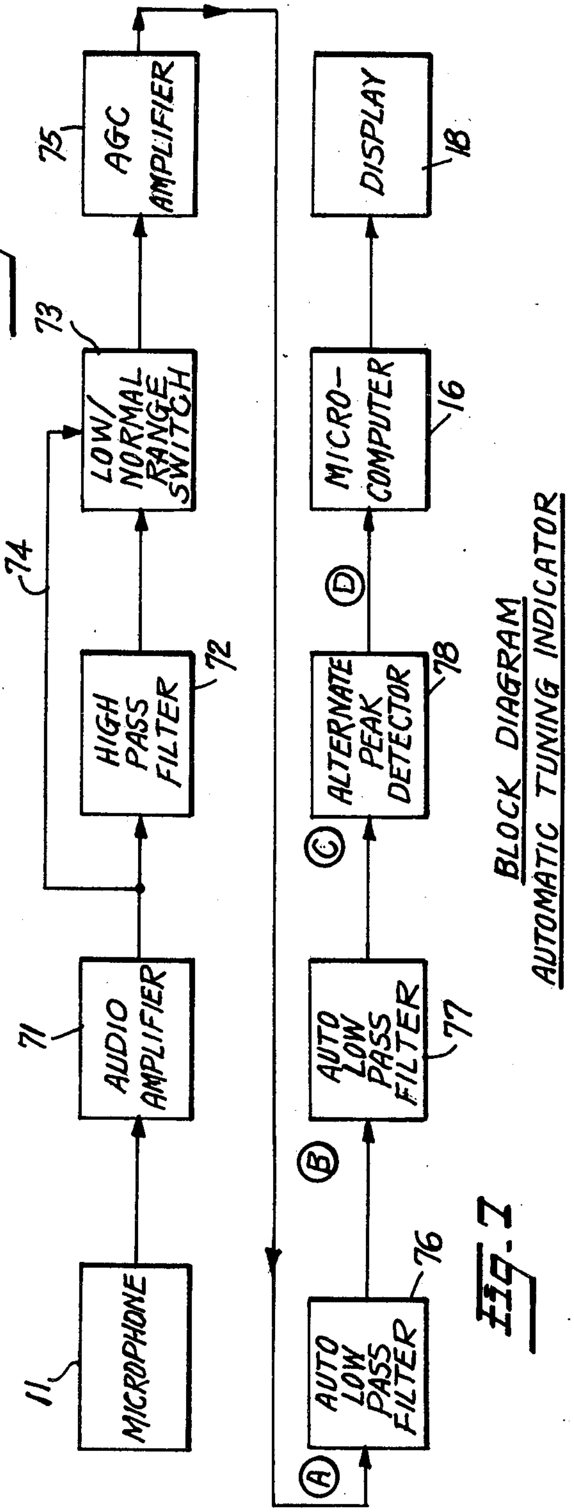
FIG. 7
BLOCK DIAGRAM
AUTOMATIC TUNING INDICATOR ALTERNATE PEAK DETECTOR
NEGATIVE PEAK DETECTOR
POSITIVE PEAK DETECTOR
ALTERNATE PEAK DETECTOR
76/77
78
TP1
TP2
101
U1
U2
U5B
U6A
U6B
U7
Q2
R1
R2
R3
R4
R5
R6
R7
R8
R9
R29
R30
R31
R32
C2
C3
C4
C5
C20
C21
C22
C23
D1
D2
D7
D8
1000pf
+5
V-

SOUND SIGNAL AUTOMATIC DETECTION AND DISPLAY METHOD AND SYSTEM

TECHNICAL FIELD

This invention relates to a sound signal automatic detector method and circuit and to the use of such detector together with a micro computer and display in a system for automatically computing from a detecting sound wave the fundamental frequency of the sound wave and displaying its value in a number of different formats.

More particularly, the invention relates to a novel sound pitch detection method and circuit and to the use of such method in an automatic system further including a micro computer and display. The system is readily operated in a hands-off manner by individual instrumentalists, vocalists and other musicians or tuners of musical instruments in conjunction with a widely varying number of musical instruments such as woodwinds, brasses, pianos, harps, guitars, violins, percussion instruments and the like as well as with the human voice for analysis and instruction or tuning purposes. When placed in operation, the novel system listens to sound waves emitted from any one of a number of widely different sound signal sources such as those listed above and automatically detects the fundamental frequency of a note. The results are then automatically displayed in a format which can be preselected by the musician or other user which will best assist the musician or other user in further training, calibrating, tuning or otherwise improving the quality of the sound being produced.

BACKGROUND ART AND PROBLEM

There are available to musicians, musical instructors and the like a number of known different systems and methods for listening to and analyzing the quality of sound waves being produced by musical instruments or the voice. Some of these known prior art systems are typified by the disclosures in U.S. Pat. No. 4,028,985, issued June 14, 1977 for a "Pitch Determination and Display System;" U.S. Pat. No. 4,122,751, issued Oct. 31, 1978 for an "Automatic Instrument Tuner;" U.S. Pat. No. 4,019,419, issued Apr. 26, 1977 for a "Tuning Device;" U.S. Pat. No. 3,896,697, issued July 29, 1975 for a "Device For Testing the Tune of Musical Instruments;" and U.S. Pat. No. 3,722,353, issued Mar. 27, 1973 for an "Electronic Tuning Device for Visual Tuning of Stringed Instruments." These are not all of the known instruments and methods for analyzing sound signals as described briefly above, but they do typify the type of equipment presently available for sound analysis and teaching or tuning purposes. The difficulty with these known equipments is that they are not easy to operate and simultaneously calibrate while playing an instrument and provide read out displays that are not easily interpreted by an operator, particularly a beginning music pupil.

A primary goal of the present invention is to provide a musical instrument sound signal automatic detection and display system which identifies automatically a note being played without requiring assistance from the instrumentalist playing the musical instrument. While the prior art describes a number of automatic tuners which allegedly are capable of such automatic operation, to the best of the inventors' knowledge such prior art systems are commercially impractical and no devices are currently being marketed which have an automatic identification feature comparable to that made available by the present invention. The current, commercially available, tuners all require that the musician or other operator specify in advance the note he wishes to tune to, generally by setting a twelve position switch to the desired note in advance of playing the note. Thus, it is not possible to tune several different notes without requiring that the operator remove his hands from the instrument he is playing to change the note selector on the tuner. The system made available by this invention does not require that the instrument operator specify the note to be played in advance since a note being played will be determined automatically by the novel detection and display system. This allows the musician or other operator to play any note on his instrument or play different notes, in any order, either in scales or at random to the best of his ability without requiring that he break his concentration to manipulate the sound signal automatic detection and display system.

The lack of foreknowledge of a note being played, is responsible for the difficulty encountered in designing a suitable sound signal processor or "front end sound detector" which can separate the fundamental frequency of a note being played from the harmonics normally present in a musical tone. In some instruments, such as the oboe, the harmonics are many times stronger than the fundamental. Additional complications are introduced by the presence of background noise and by the wide variation in the amplitude of different sound signals to be analyzed.

The conventional approach utilized in currently available tuners is to extract the fundamental frequency of a sound wave being analyzed by using a narrow tuned filter or phase locked loop, which is set in advance by the musician for a particular note to be played. Obviously, such known techniques could not be used in the present system due to lack of advance knowledge of which notes will be present in a sound wave being analyzed. Accordingly, the invention makes available a novel front end sound signal detector, which automatically works over a wide range of frequencies. An alternate peak detector is the principal element employed in this novel front end sound detector. It can extract the fundamental frequency of any input sound signal without advance knowledge of the approximate frequency value, since its operation does not depend on tuned circuits. Automatic gain control and automatic filter stages enhance the performance sufficiently to make the resultant output processed signal really useful. The only way that the musician or other operator of the system has to specify in advance information about a note to be played is with a low/normal range switch which extends the useable range of the detector to include some very low notes at the expense of some increased sensitivity to background noise. Even with the selector switch in the "low" position, the full range of notes in the musical scale can be processed by the system.

DISCLOSURE OF INVENTION

It is therefore a primary object of the invention to provide a sound signal automatic detection circuit and method for use with a micro computer display in a system for automatically detecting an input sound wave and thereafter automatically computing from a detected sound wave the fundamental frequency of the sound wave and displaying its value in a number of different formats useful to a musician, an instructor, a student of music, a musical instrument manufacturer or an instrument tuner. The system is reasily operated in a hands-off manner by a user of the equipment after being initially placed in operation and provides an output indication of the quality of sound being produced in a number of different display formats. The formats displayed may be selectively used by an operator of the equipment according to his needs.

Another object of the invention is to provide a novel alternate positive polarity and negative polarity peak voltage detector circuit for detecting and deriving an output indication of the value of the fundamental frequency of an input signal wave being analyzed.

A further object of the invention is to provide a system having the above characteristics which employs a novel automatic narrow bandpass filter arrangement for improving the signal to noise ratio of the system.

In practicing the invention, a sound pitch automatic detection circuit is provided which comprises a sound signal transducer for converting a sound signal to be analyzed into an electrical signal having corresponding audio frequency characteristics and a generally sinusoidal varying wave shape. The audio frequency electric signal is supplied to an amplifier having audio frequency bandpass characteristics compatible with the sound frequency spectrum over which the sound signal to be analyzed extends. The amplified audio frequency signal is supplied to alternate positive polarity and negative polarity peak voltage detector for detecting the first major positive going peak voltage and the first major negative going peak voltage which exceed respective positive and negative threshold voltage values and which occur in each fundamental period of the generally sinusoidally varying waveshape electric signal. An output electric signal representative of the fundamental frequency of the signal being analyzed is derived from the alternate positive polarity and negative polarity peak voltage detector. In preferred embodiments of the invention bandpass filter means are connected in the circuit to pass only a desired portion of the audio spectrum to be analyzed to the alternate positive polarity and negative polarity peak voltage detector. The bandpass filter preferably comprises a high pass filter stage having its output supplied to an automatic gain control amplifier which in turn supplies two successive, automatically adjustable low pass filter stages. The low pass filter stages automatically adjust their frequency response characteristics to lower the frequency passed by the two stages until such point that the amplitude of the output signal from the output of the two stages begins to drop below the amplitude value of the signal set by the automatic gain control circuit at which point further restriction of the frequency response of the two low pass filter stages, ceases.

The sound pitch automatic detection circuit is included in an overall system further including a micro computer responsive to the output from the alternate peak detector for measuring the elapsed time required to derive an integral number of cycles of the fundamental frequency output signal, and for dividing the integral number of cycles by the elapsed time to thereby obtain a frequency signal that is indicative of the value of the fundamental frequency of the sound signal being analyzed. The system further includes a display which is responsive to the output from the micro computer for displaying the value of the fundamental frequency of the sound signal to an operator of the system.

In operation, the micro computer is programmed to sequentially compute several measured values of the fundamental frequency of the sound signal being analyzed and thereafter stores the computed fundamental frequency measured value. The micro computer also includes a comparator for comparing several computed measured values of the fundamental frequency for correspondence to determine that the several values all lie within the same range plus or minus a given tolerance and thereafter gates out the computed measured fundamental frequency values to the display in response to the several computed measured values lying within the same range within the acceptable tolerances.

The micro computer further includes a musical note memory having the frequency value of recognized musical notes comprising the musical scale stored therein. A musical note comparator within the micro computer is used to compare the computed measured value of the fundamental frequency of a sound wave being analyzed to determine the frequency value of the nearest recognized musical note and to derive an output error signal representative of the difference in frequency between the sound signal being analyzed and the nearest recognized note in the musical scale. The display is responsive to this error signal so as to display to an operator of the system the difference in frequency between the note that he is playing and the nearest recognized note in the musical scale. The display also identifies the nearest recognized musical note as determined from the musical note memory.

The micro computer further includes a relative calibration factor computation circuit and memory which is responsive to the measured frequency memory and to the musical note memory for dividing the frequency value of the nearest recognized musical note by the stored computed measured value of the fundamental frequency of the sound signal being analyzed and to derive the store in a memory a relative calibration factor equal to their quotient. Selectively operated user controlled multiplier means are included in the micro computer for selectively multiplying subsequent computed measured fundamental frequency values of a sound signal being analyzed by the relative calibration factor and the display gate is actuated to display the output from the multiplier to the operator of the system.

In addition to the above features, key select means are provided which are selectively operable by an operator of the system and are connected to control the micro computer for displaying to the operator the identification of the note closest to that of the computed measured value of the fundamental frequency of a sound signal being analyzed in the appropriate notation or key which is most convenient for the operator. Actuator means are provided which allow the operator to determine the notation or key selected and also to change the notation or key by advancing the key selected by one or more notes at a time.

BRIEF DESCRIPTION OF THE DRAWINGS

These and many other objects, features and attendant advantages of the invention will be better understood from a reading of the following detailed description when considered in connection with the accompanying drawings wherein like parts in each of the several figures are identified by the same reference numbers; and wherein:

FIGS. 3A through 3D are a series of wave forms which illustrate the operation of the alternate peak detector shown in FIG. 2;

FIG. 5 is a more detailed functional block diagram of the essential portions of the micro computer used in the system of FIG. 1;

FIG. 7 is a functional block diagram of a preferred form of automatic sound signal detection and display system according to the invention and constitutes the best known mode of practicing the invention at the time of filing this application;

FIG. 11 illustrates its operation; FIGS. 12 and 12A illustrates its operation.

BEST MODE OF CARRYING OUT THE INVENTION

Figure 1:
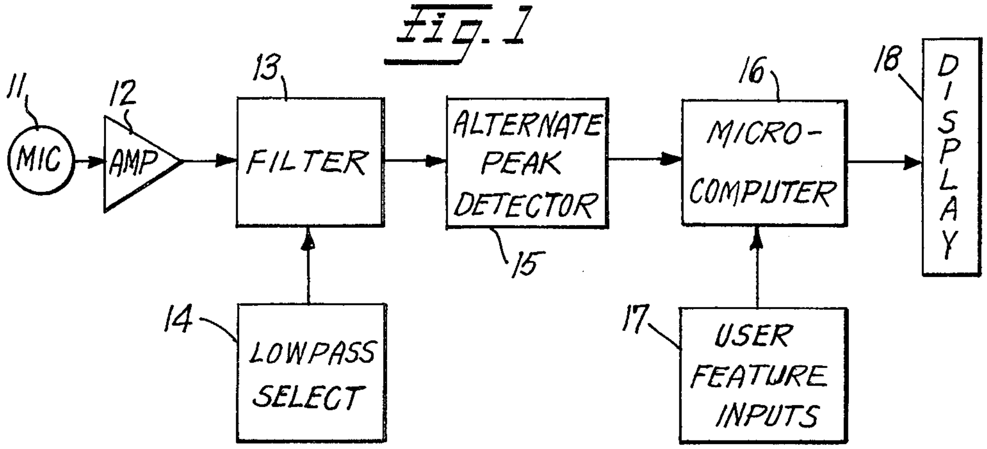
FIG. 1 is a functional block diagram of one embodiment of an overall sound signal automatic detection and display system according to the invention and which comprises a front end sound signal detector, a microcomputer and a display.

FIG. 1 of the drawings is a functional block diagram of an overall sound pitch automatic detection and display system constructed in accordance with the invention. In FIG. 1, a microphone is shown at 11 for converting sound waves to be analyzed into electrical signals that are supplied to the input of a first stage audio amplifier 12. The microphone 11 may comprise any conventional, commercially available microphone for picking up sound waves and converting the sound waves into an electrical signal of corresponding frequency to the frequency of the sound waves. The microphone 11 and first stage audio amplifier 12 should be tailored to respond to all sound signals extending over a frequency spectrum of about 30 hertz to 3 kilohertz. The output from the audio amplifier 12 is supplied to a lowpass filter 13 that is controlled by a lowpass selector switch 14 for selecting a discrete portion of the audio frequency spectrum in which a user of the instrument is interested by means of the lowpass filter 13. Filter 13 is a lowpass filter that selectively attenuates a selected portion of the audio frequency spectrum, for example, the frequencies above 50 Hz, the frequencies above 200 Hz, the frequencies above 800 Hz or pass all frequencies, and supplies the nonattenuated signals to the input of an alternate peak detector 15. The construction and operation of the alternate peak detector will be described more fully hereinafter with relation to FIGS. 2, 3A and 3B of the drawings. Suffice it to say that the alternate peak detector operates to detect the fundamental frequency sound signal supplied to it from the output of the lowpass filter 13 and to derive at its output a substantially square wave alternating signal whose frequency corresponds to the fundamental frequency of the sound wave picked up by the microphone 11. This square wave fundamental frequency signal then is supplied to a micro computer 16 which can be present in advance of a practice session via a user feature input circuit 17 to provide an output to a display unit 18 representative of such characteristics as the frequency value (pitch) of the sound signal picked up by microphone 11, the difference in frequency value of the sound signal from a recognized note on the musical scale, etc.

From a consideration of FIG. 1, it will be appreciated that the overall system consists essentially of three portions, a front end or signal sensing portion, a signal processing portion and a display portion. The front end or signal sensing portion is comprised by the microphone 11, the first stage audio amplifier 12, the filter circuit 13 and the alternate peak detector 15. The signal processing and display portion is comprised by the micro computer 16 and display 18. The ability to effectively assist a student, instructor or performer of music, depends entirely on the quality and fidelity of the signal supplied to the micro computer 16 by the front end or signal sensing portion of the system. It is believed that one of the reasons that prior art instruments intended for the same purpose as this invention, such as those noted earlier, have not come into widespread use, is due to the problem of faithfully sensing and detecting the pitch of sound signals to be analyzed. This must be done with equipment which is economically feasible for students of music to purchase and also it must be simple to operate by a person who at the same time is performing on a musical instrument with which he is trying to acquire proficiency.

Figure 2:
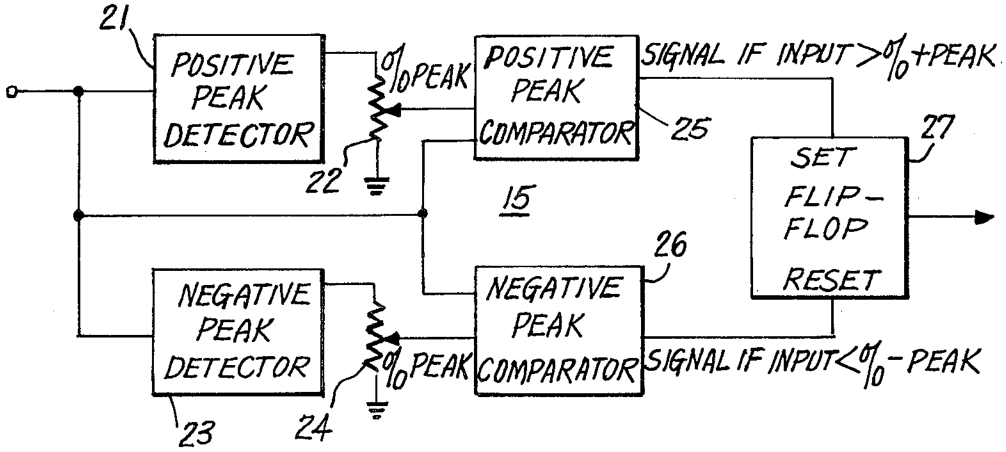
FIG. 2 is a functional block diagram of one form of an alternate peak detector suitable for use as part of the sound signal detector in the system of FIG. 1.

Applicants have determined that in order to have a practical and economically feasible sound signal analyzer, it was necessary to first devise a suitable detector which could faithfully reproduce an output signal representative of the actual pitch of a sound signal to be analyzed. FIG. 2 of the drawings is a functional block diagram of one form of a suitable alternate peak detector according to the invention for use in the system of FIG. 1 and which comprises the heart of the front end or sound signal sensing portion of the system. The alternate peak detector shown in FIG. 2 operates on the basic principle that multiple peaks in the same direction of a sound signal being analyzed, are likely, but that all major positive peaks will occur before all major negative peaks. Based on this premise, the alternate peak detector of FIG. 2 as well as that shown in FIG. 10, has been devised to detect alternate occurrences of positive and negative peaks, and hence has been termed an alternate peak detector. In operation, the alternate peak detection levels automatically vary in proportion to the amplitude of the signal being processed, as will be explained more fully hereinafter.

Based on the foregoing premise, the alternate peak detector shown in FIG. 2 is comprised by a positive peak detector 21 having its output supplied across a variable resistor 22 and a negative peak detector 23 having its output applied across a variable resistor 24. The input sound signal supplied from the output from filter 13 is applied to the input terminals of both the positive peak detector 21 and the negative peak detector 23 and also is supplied to one input terminal of a positive peak comparator 25 and to one input terminal of a negative peak comparator 26. The positive peak comparator circuit 25 has a second input terminal connected to the moveable tap-off point of variable resistor 22 and the negative peak comparator circuit 26 likewise has a second input terminal connected to the variable tap of variable resistor 24. The outputs from the positive peak comparator circuit 25 and the negative peak comparator circuit 26 are supplied to the set and reset input terminals, respectively, of a flip-flop circuit 27.

Figure 3A:
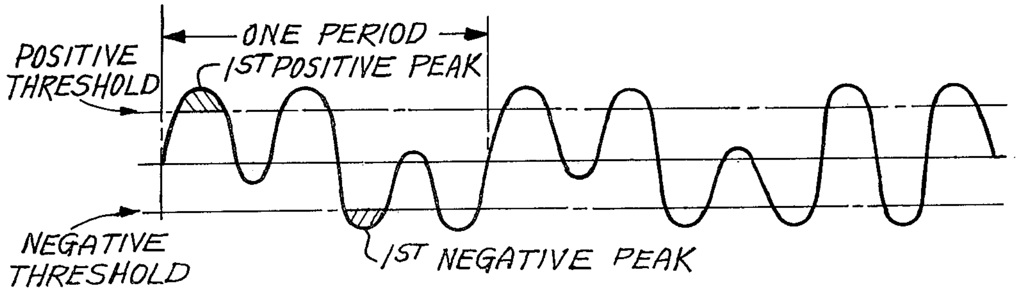

FIGS. 3A-3D of the drawings are wave forms which illustrate the operation of the alternate peak detector shown in FIG. 2. In FIG. 3A, an input audio frequency signal waveshape is illustrated which is typical of the kind of waveshape that the system must process faithfully if it is to function properly. As illustrated in FIG. 3A, this particular audio signal wave form has two major positive peaks located on opposite sides of a minor negative peak followed by two major negative peaks located on opposite sides of a minor positive going peak. It is not altogether impossible or improbable that the second major positive going and the second major negative going peak will be of substantially the same or even greater amplitude than the first major positive and negative going peaks which they follow. It should be noted, however, that in accordance with the foregoing premise, both major positive peaks occur before the occurrence of the two major negative peaks. By establishing a suitable threshold value which exceeds the amplitudes of the intervening minor negative going and positive going peaks, it is possible to detect and thereafter process the occurrence of only the first major positive peak and the first major negative peak in the generally sinusoidal waveshape signal having a period which includes two major positive peaks and two major negative peaks.

For the foregoing purpose, the alternate peak detector shown in FIG. 2 includes the variable load resistors 22 and 24 for the positive peak detector circuit 21 and negative peak detector circuit 23, respectively. By tapping-off a proportional value of the peak voltages appearing across the load resistors 22 and 24, the respective positive and negative threshold values can be obtained and supplied as one of the inputs to the positive peak and negative peak comparator circuits 25 and 26, respectively. FIG. 3B illustrates the waveshape of the signal obtained from the output of the positive peak detector 25 and FIG. 3C shows the output obtained from the output of the negative peak comparator circuit 26. While the sound signal analyzing system is operating, these output signals continuously are supplied to the set and reset input terminals, respectively, of the flip-flop circuit 27.

In comparing FIGS. 3B to 3C, it will be noted that there are two positive going pulses produced at the output of the positive peak comparator 25 which occur timewise in advance of the two negative going peaks produced at the output of the negative peak comparator 26. The leading edge of the first set of positive going pulses shown in FIG. 3B initially will set the flip-flop circuit 27 to a first operating condition as shown in FIG. 3D of the drawings. Thereafter, the succeeding positive going pulse that is applied to the set input terminal will have no effect on the operation of the flip-flop circuit 27. Upon the occurrence of the leading edge of the two negative going pulses at the output of the negative peak comparator 26 representative of the occurrence of the negative going major peaks of the signal shown in FIG. 3A, the leading edge of the first pulse applied to the reset terminal of flip-flop 27 will cause this circuit to reset to its second operating state as shown in FIG. 3D. Here again, the occurrence of the second negative going peak will have no effect on operation of the flip-flop since it is applied to the same reset terminal as the first negative going peak. As a consequence, a substantially square wave alternate positive going and negative going signal will be produced at the output of flip-flop circuit 27 which will have a period that is representative of the fundamental frequency of the sound wave signal being analyzed.

Figure 4:
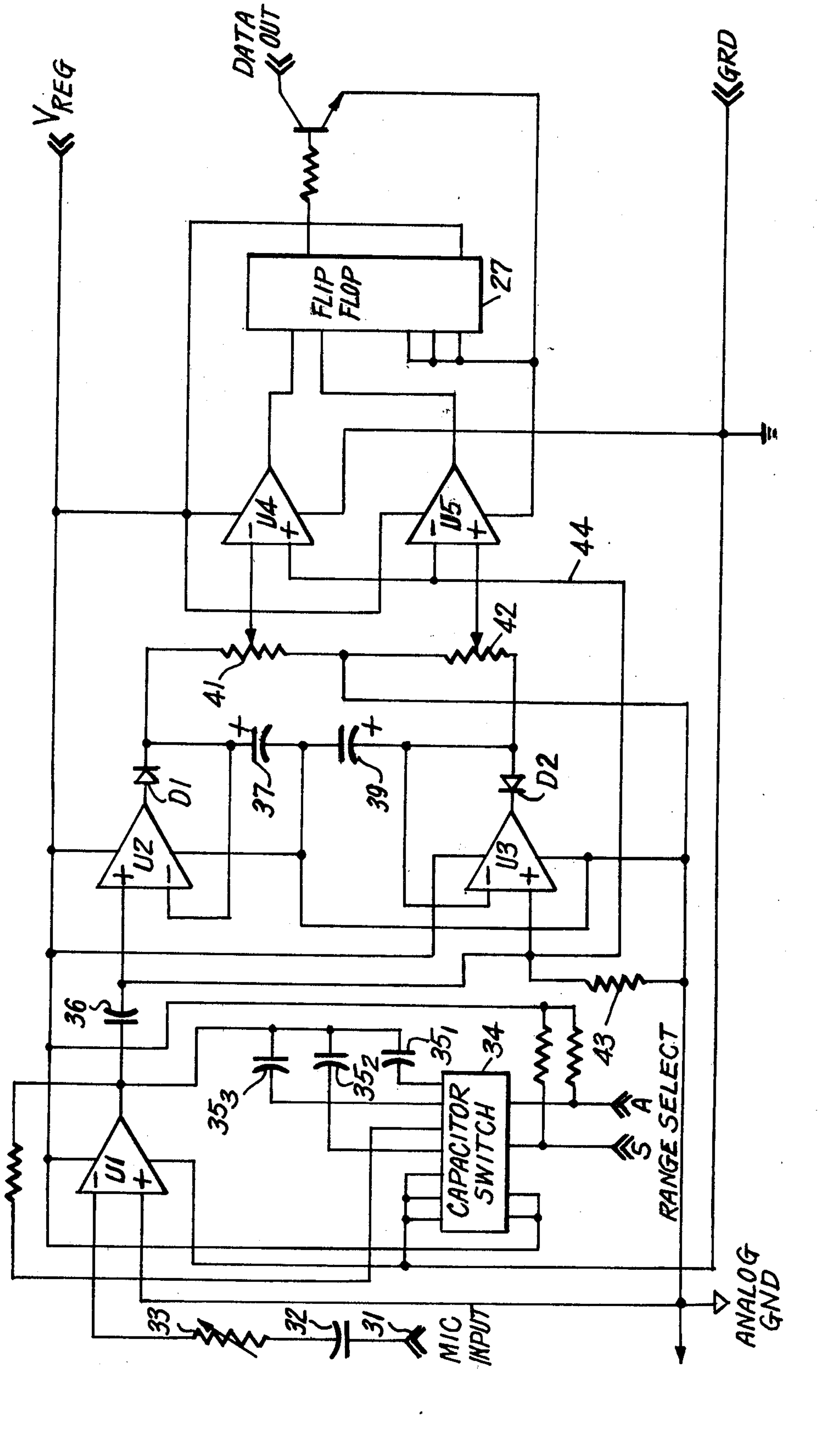
FIG. 4 is a detailed circuit diagram of the input stage, the bandpass filter amplifier stage, the alternate peak detector and output stages of the automatic sound signal detection system shown in FIG. 1.

FIG. 4 of the drawings is a more detailed circuit diagram of the front end or signal processing portion of the system shown in FIG. 1 and is comprised by a jack 31 into which a suitable microphone is plugged. The jack 31 is coupled through a DC blocking capacitor 32 and volume control resistor 33 to one input terminal 2 of an operational amplifier U1. The operational amplifier U1 may comprise a conventional, commercially available integrated circuit operational amplifier of the type sold commercially by manufacturers such as the Radio Corporation of America, Texas Instruments Corporation and the like. The amplifier U1 is connected to operate as an audio amplifier having a user operated capacitor switch interconnected with different value capacitors $35_1$, $35_2$, etc. for selectively changing the discrete audio lowpass characteristics of the amplifier U1. The output from amplifier U1 is supplied through a second DC blocking capacitor 36 both to one input terminal of a positive peak detector comprised by an operational amplifier circuit U2 having a diode D1 connecting its output across a load capacitor 37, and through a conductor 38 to one input terminal of the negative peak detector comprised by an operational amplifier circuit U3 having a diode D2 connecting its output across a load capacitor 39. The circuits U2 and U3 each comprise conventional, commercially available integrated circuit amplifiers such as those manufactured and sold by the previously noted firms. U2 and U3 are interconnected with the diodes D1 and D2 in a manner taught by the manufacturers' product description literature so that the circuits will operate as peak detectors. Because of the reversal in polarities of the respective diodes D1 and D2, the circuits will function as a positive peak detector and a negative peak detector, respectively.

The voltages appearing across the capacitors 37 and 39 are supplied across a pair of series connected variable tap resistors 41 and 42 whose juncture is maintained at system ground potential with the juncture of the capacitors 37 and 39 being connected back to actual ground. A fixed resistor 43 is connected between system ground and conductor 38 and functions in conjunction with capacitor 36 as a filter for voltage spikes that might be produced in the system in advance of the peak detectors. The variable tap points on the adjustable tap resistors 41 and 42 are connected to an input terminal of a positive peak comparator U4 and a negative peak comparator U5, respectively. Again, the comparators U4 and U5 constitute conventional, commercially available integrated circuit amplifier structures connected in accordance with their manufacturers' instructions to function as comparator circuits. The remaining input terminals of the positive peak comparator U4 and the negative peak comparator U5 are connected back through a conductor 44 and conductor 38 to the output of the audio amplifier U1 via DC blocking capacitor 36. The outputs of the positive peak comparator U4 and the negative peak comparator U5 are connected to the set and reset input terminals, respectively, of the flip-flop circuit 27. Flip-flop circuit 27 may comprise any conventional, commercially available flip-flop circuit manufactured and sold by a number of integrated circuit manufacturers such as those noted above, and has its output connected through a suitable output amplifier stage to the input of the signal processing portion of the system as described hereinafter with respect to FIG. 5.

In operation, the circuit of FIG. 4 functions in the manner described previously with relation to the functional block diagram of FIG. 2.

FIG. 5 is a functional block diagram of the essential parts of a suitable micro processor for use as the micro computer 16 of the system shown in FIG. 1. This micro processor is comprised by a timer circuit 51 to which the output square wave signal derived from flip-flop 27 of the signal processing portion of the system is supplied. The timer circuit 51 functions to measure the time required for an even, integral number of cycles of the square wave signal supplied from the alternate peak detector to occur. The number of cycles and the time required then is supplied to a central processing unit 52 that serves to calculate the frequency of the sound wave being analyzed in accordance with the classical formula $f=1/T$. This is achieved by dividing the number of integral cycles counted by timer 51 by the measured interval of time required for the number of cycles to occur. The resultant value is the measured frequency value of the input wave being analyzed and may be stored in a data memory bank shown at 53. A program stored in a program memory shown at 54 preferably programs the micro processor to perform this calculation a number of times in order to obtain several frequency readings (for example 3) which then must fall within certain tolerances which can be determined by storing the resultant value from each calculation in a working memory and comparing all the values with a comparator comprising a part of the central processing unit 52. Upon the occurrence of say three corresponding readings, the micro processor can be programmed to trigger the display and store one of the resultant measured values, or an average measured value, in the working memory of the central processing unit 52. The resultant measured value also is supplied to input/output registers 55 for exciting appropriate segments of the display.

When the display is triggered, an error count is set to zero in a counter in the micro computer. Each subsequent reading is compared to the previous acceptable reading to determine if it is also acceptable. If the new reading is acceptable the average value is updated and the error count is decreased by 2, but not to a value less than 0. If the reading is unacceptable, (outside tolerance) the average remains unchanged and the error count is increased by 1. If the count exceeds a certain number, say 8, the note is assumed to have stopped, the display is turned off and the note is no longer displayed.

Processing in the micro processor is controlled by a suitable clock source of timing signals 56 connected to the timer circuit 51 and to the central processing unit 52 for controlling interaction of the several parts of the micro processor as well as controlling operation of the central processing unit.

By storing appropriate programs in the program memory 54, and the addition of an operator controlled key select switch, shown at 57, as well as a relative calibration switch 58, additional functions can be performed with the data stored in data memory 53. For example, the corresponding frequencies of recognized musical notes comprising the musical scale can be stored in the data memory 53.

Key select switch 57 is used to identify to micro computer 16 the key in which an instrument is to be played. Key select is not changed during normal operation of the system. It is set once each time the system is turned to the appropriate key for the musical instrument to be tuned. This is necessary because different instruments assign different names (notes) to the same frequency. This is specified for each instrument by the name of the note on the concert scale which is produced by the instrument when a 'C' is played on the instrument. Many instruments, such as the piano, violin and guitar produce a concert C when a C is played, hence these instruments play the 'Key of C'. Other instruments, such as the clarinet and French horn, do not produce a concert C when playing a C. The most common clarinet produces a concert Bb (it is called a Bb-clarinet), while a horn produces a concert F. Since the system assumes a concert or C scale it would identify a C played on a clarinet as a Bb, which is correct but may be confusing to the user. The following table shows the relations of the different scales:

| | | | | | | | | | | | | | |
|---|---|---|---|---|---|---|---|---|---|---|---|---|---|
| Concert Scale | C | C# | D | Eb | E | F | F# | G | G# | A | Bb | B | C |
| Piano Scale | C | C# | D | Eb | E | F | F# | G | G# | A | Bb | B | C |
| Bb Clarinet | D | Eb | E | F | F# | G | G# | A | Bb | B | C | C# | D |
| French horn | G | G# | A | Bb | B | C | C# | D | Eb | E | F | F# | G |

By identifying to the micro computer via key select switch 57 in advance (only once per practice session) the key of the instrument to be played, it can correct the display to give appropriate indications to the user. Thus a clarinetist would set the key to Bb so the system would work correctly with his instrument.

Upon the relative calibration switch 58 being closed, the input frequency of a note being played into the microphone can be stored in the data memory in which the correct frequency of the note being played already has been stored. The program memory 54 is programmed to cause the central processing unit 52 to divide the correct frequency for the nearest note to that being played by the measured frequency value of the note being played with the quotient then being stored in the data memory as a relative calibration factor. Thereafter, with the system operating in this mode, all future notes being played are multiplied by the calibration factor as a means for calibrating the response of the system to the notes being played by a particular musical instrument. For example, the correct frequency value for middle C in the diatonic scale is 256 hertz. If, for example, the measured frequency value for middle C being played by a particular instrument turns out to be 254 hertz, the relative calibration factor is obtained by dividing 256 by 254 and thereafter all succeeding notes played by that particular instrument can be corrected through the use of the relative calibration factor in order to obtain a reading of the relative character of the musical notes being played by that instrument (or instrumentalist).

In addition to the above-described features, the micro processor includes a key advance switch 59 which can be depressed in conjunction with the key select switch 57 to cause the program memory 54 automatically to advance the key selected one half tone for each actuation of the key advance switch.

The micro processor shown in FIG. 5 can be specially fabricated with only those components shown in FIG. 5 comprising a part of the micro processor. Alternatively, conventional, commercially available micro computers which normally include all of the components shown in FIG. 5, can be employed and appropriately programmed in a manner known to those skilled in the art to perform the functions described in the preceding paragraphs.

Figures 6, 8:
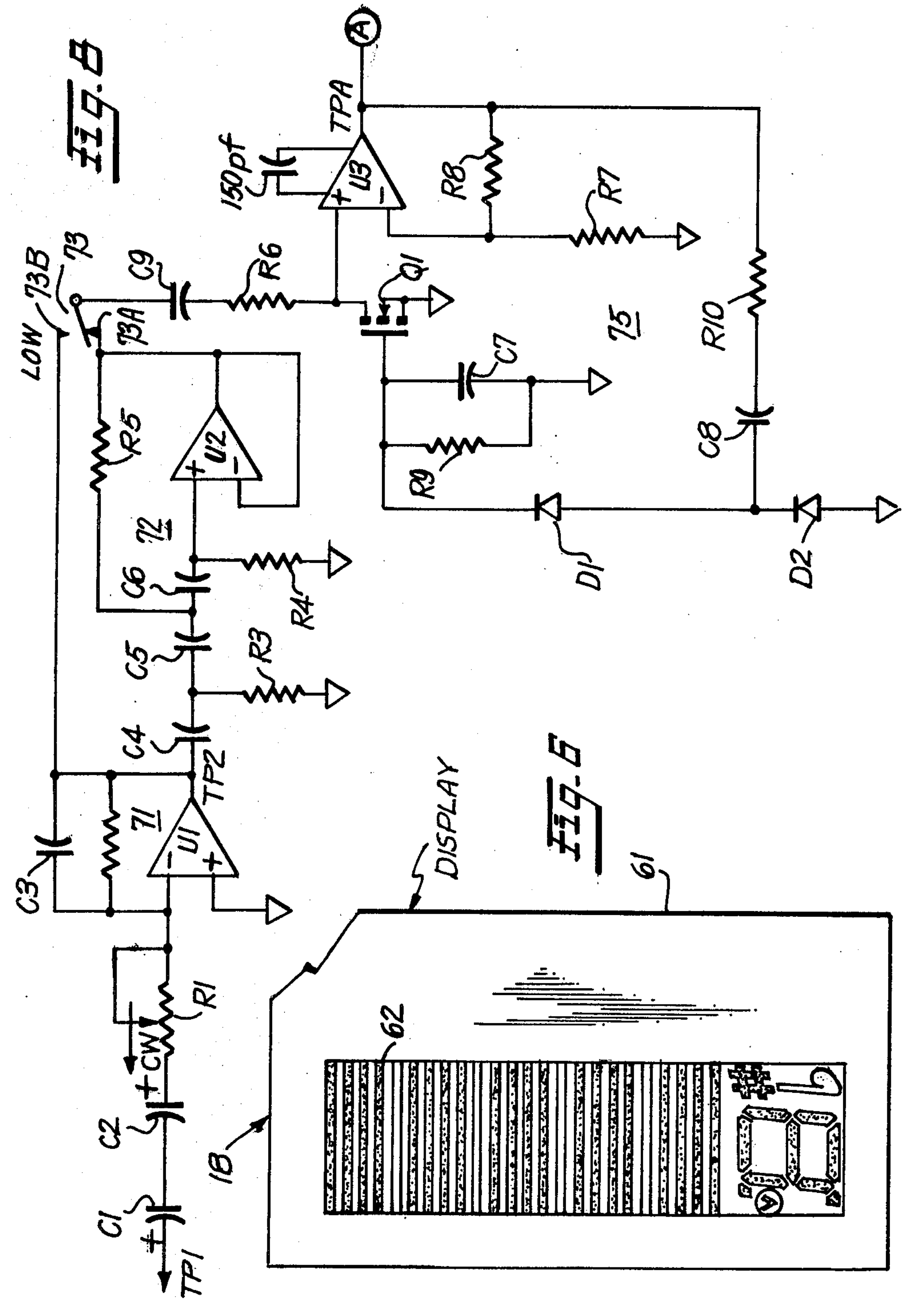
FIG. 6 illustrates one format for a suitable display for use with the system of FIG. 1.
FIG. 8 is a detailed circuit diagram of the input preamplifier, high pass filter and automatic gain control stages of the system shown in FIG. 7.

FIG. 6 of the drawings depicts one suitable format for the display which will be used by the sound pitch automatic detection system and which will be connected to the output of the input-output register 55 of the micro computer. The display shown in FIG. 6 preferably comprises a liquid crystal display but also could comprise any other known, low voltage, relatively low cost display structure such as an electro luminescent display, light emitting diodes or the like. The display is formed by a base or body member 61 on which is formed a suitable running scale shown at 62. The running scale 62 in fact comprises a series of parallel plate electrodes or stroke bars which are alternately made visible or invisible to the eye of the viewer depending upon the manner of their excitation by the micro computer via input/output register 55. Thus, the output from the micro computer determines the visual effect achieved with the display. If the actual measured frequency value of the note being played is on tune, the bars on the panel 62 will remain steady. If the actual measured frequency value is off tune, then there will be relative movement of the bars along the length of the panel 62. The greater the difference between the true note and the actual measured frequency value, the faster the relative movement of the bars will be. The direction of movement either up or down will indicate whether the actual measured frequency value is above the true note or below the true note. In addition to the tuning bar 62, the display further includes a set of characters such as Bb, etc. which indicates the nearest note to that which is being measured and includes either a sharp or flat sign which will appear to the right of the note identification letters if the note is indeed sharp or flat. A further feature of the display is to indicate whether or not a variable pitch reference is being used by the user of the instrument and this will appear as a v to the left of the note identification characters as shown in FIG. 6. This variable pitch reference character will appear under those circumstances where the user has actuated the relative calibration switch 58 and indicates that the entire scale of correct frequencies has been shifted so as to agree with the note being played when the switch was activated.

FIG. 7 is a functional block diagram of a preferred form and believed to be best mode of practicing the invention. In the system of FIG. 7 a microphone 11 supplies its output to an audio amplifier 71 having response characteristics extending over the entire audio range from about 30 hertz to 3 kilohertz. The output from amplifier 71 is supplied through a high pass filter 72 that may be left in or switched out of the system through the medium of a low/normal range switch 73 that serves to bypass the high pass filter 72 when closed via a bypass conductor 74. The signal appearing at the output of the high pass filter 72 when it is connected in the circuit or appearing over conductor 74, is applied to the input of an automatic gain control amplifier 75. The automatic gain control amplifier 75 operates to maintain the amplitude of the signal being processed at a substantially constant value and to supply this constant value signal through a two-stage automatic low pass filter 76 and 77 to an alternate peak detector 78. The output from the alternate peak detector 78 then is supplied to a micro computer 16 for processing in the same manner as was described with relation to the system of FIG. 1 and FIG. 5 with the processed signal results being displayed on the display 18. It will be appreciated therefore that the signal processing portion of the system shown in FIG. 7 is essentially identical to the signal processing portion of the system shown in FIG. 1 with the two systems differing only in the details of design and operation of the input signal frequency detecting portions thereof.

FIG. 8 is a detailed circuit diagram of the input stages and automatic gain control amplifier 75 of the pitch detection and display system shown in FIG. 7. In FIG. 8 a microphone or other suitable sound signal sensor is connected at test point TP1 through DC blocking capacitors C1 and C2 and variable volume control resistor R1 to one input terminal of an integrated amplifier circuit U1. Circuit U1 is a conventional, commercially available, integrated operational amplifier circuit such as those manufactured and sold by the Texas Instrument Corp., Radio Corporation of America, Motorola, etc., which is interconnected through appropriate external components such as feedback resistor R2 and capacitor C3 network to operate as an audio amplifier having a response characteristic extending from 30 hertz to 3 kilohertz and thus comprises the audio amplifier stage 71 of the system block diagram shown in FIG. 7.

The output from the audio amplifier stage 71 during normal operation of the system is taken from test point TP2 and supplied to a high pass filter 72 comprised by capacitors C4, C5 and resistor R3 together with capacitor C6 and resistor R4, integrated amplifier circuit U2 and feedback resistor R5. The integrated amplifier circuit U2 again comprises a conventional, commercially available integrated operational amplifier circuit manufactured and sold by any of the above-listed manufacturers. The high pass filter circuit 72 formed by these components operates to eliminate substantially all signals having a frequency lower than 75 hertz. Accordingly, where it is desired to sense and process audio frequency signals below 75 hertz, it is necessary to switch the high pass filter 72 out of the circuit through the medium of the two position normal/low switch 73 by moving its moveable contact from the normal fixed contact 73A to the low fixed contact 73B. With the moveable contact 73 on fixed contact 73B, the high pass filter 72 will be bypassed and the output from the audio amplifier stage 71 will be supplied directly to the input of the automatic gain control circuit 75.

The input signal processed by audio amplifier stage 71 and high pass filter 72 or alternatively by audio amplifier stage 71 alone, is supplied through a DC blocking and coupling capacitor C9 over a fixed resistor R6 to the drain electrode of a field effect transistor (FET) Q1 whose source electrode is directly connected to ground. The drain of FET Q1 also is connected to one input terminal of an integrated circuit operational amplifier U3 of conventional commercial construction. The integrated circuit amplifier U3 has its output terminal connected back through a first feedback circuit comprised by fixed resistors R7 and R8 connected in series between the output and ground and having their juncture connected to an inverse input terminal of amplifier U3.

The output terminal of amplifier U3 also is connected back through a feedback path comprised by fixed resistor R10 and capacitor C8 to the juncture of a pair of diodes D1 and D2. The diodes D1 and D2 in conjunction with parallel connected resistor R9 and capacitor C7 form a rectifying and smoothing network whose output is connected to the gate of field effect transistor Q1. Hence, it will be appreciated that the output from operational amplifier U3 is rectified, smoothed and applied to the gate of field effect transistor Q1. With this arrangement, if the output of amplifier U3 tends to increase above a set point, it will increase the conductivity of field effect transistor Q1. This in effect tends to shunt the input signal away from the input of U3 and results in decreasing the amplitude of the output at TP4. Conversely, if the output from U3 at test point TP4 tends to decrease, this in turn will decrease the conductivity of Q1 and will increase the amplitude of the input signal applied to the input terminal of U3 from the juncture of Q1 with fixed resistor R6. This in turn results in increasing the amplitude of the signal appearing at the output TP4 of amplifier U3. Thus U3 in conjunction with FET Q1 forms an automatic gain control amplifier for maintaining the magnitude of the output signal supplied from its output TP4 substantially at a preset, constant amplitude value.

Figures 9, 10:
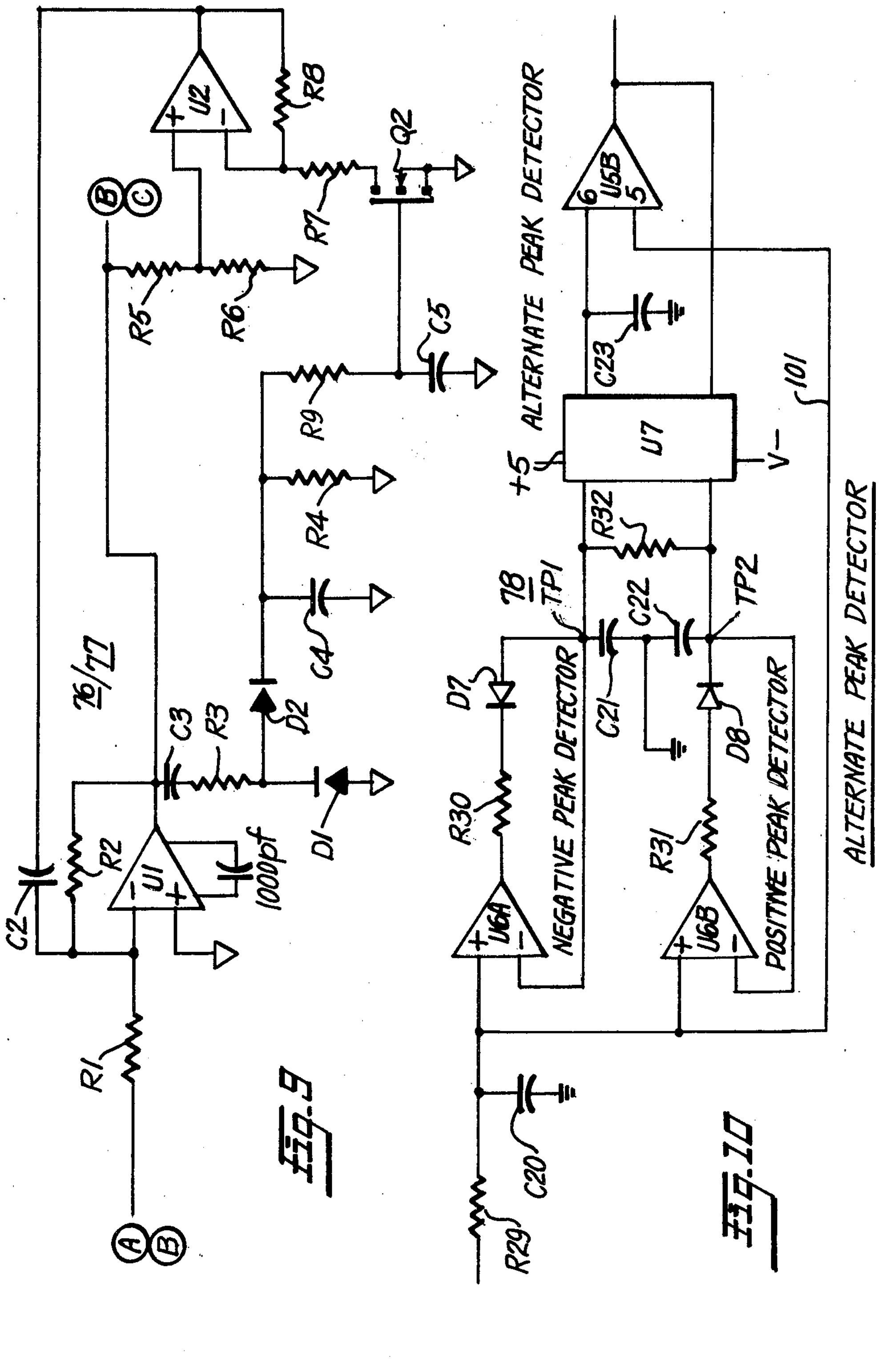
FIG. 9 is a detailed circuit diagram of one of the automatically adjustable low pass filter stages employed in the system of FIG. 7
FIG. 10 is a detailed circuit diagram of a preferred form of alternate peak detector utilizing a multiplexer employed in the system of FIG. 7

The gain controlled signal appearing at the output of the automatic gain control amplifier stage 75 is supplied to the input of the first stage automatic low pass filter network 76 whose construction and operation is identical to the second stage automatic low pass filter network 77. Accordingly, the details of construction and operation of the automatic low pass filter network shown in FIG. 9 are applicable both to the first and second stage automatic low pass filters and the interconnection points A, B and C noted in the block diagram of FIG. 7 are identified as the same points in FIG. 9. The fixed amplitude signal from AGC amplifier 75 is supplied to the input of the first automatic low pass filter stage 76 through a fixed resistor R1 to an inverse input terminal of a conventional, commercially available, integrated circuit operational amplifier U1. The gain of amplifier U1 is designed to be initially at about six decibels and is determined in part by the value of a fixed resistor R2 connected between the output of U1 and its inverse input terminal and the value of a feedback voltage supplied through a feedback capacitor C2. The output from the automatic low pass filter stage, indicated at B, C, is taken directly from the output of operational amplifier U1. In addition to output terminals B, C, a voltage dividing resistor network comprised by fixed resistors R5 and R6 is connected between the output of U1 and system ground. The juncture of the fixed resistors R5 and R6 is connected to the direct input terminal of a second conventional, integrated circuit operational amplifier U2 whose output is connected back through feedback capacitor C2 to the inverse input terminal of operational amplifier U1. The output of operational amplifier U2 also is connected back to its inverse input terminal via a fixed resistor R8 connected in series circuit relationship with a fixed resistor R7 and a FET Q2 having its drain electrode connected to resistor R7 and its source electrode connected to system ground. The juncture of fixed resistors R7 and R8 is connected to the inverse input terminal of operational amplifier U2. The gate of FET Q1 is connected to the output of a rectifying and smoothing network comprised by a pair of diodes D1 and D2 whose juncture is connected through a pair of diodes D1 and D2 whose juncture is connected through a series capacitor resistor network C3, R3 to the output of operational amplifier U1. The output from the rectifying diodes D1 and D2 is coupled through a smoothing network C4, R4, R9 and C5 to the gate of FET Q2. With this arrangement, FET Q2 functions as a voltage variable resistor that reduces the gain of operational amplifier U2 to thereby vary automatically the phase shifted feedback voltage supplied from U2 through coupling capacitor C2 back to the input of first stage operational amplifier U1. Thus, while the circuit initially responds to any given frequency input signal with an initial gain of about 2, it quickly cuts back the overall gain of the circuit to unity gain through the bandwidth constricting action of FET Q2. The circuit in effect constitutes an automatic gain control amplifier which operates to reduce bandwidth of the circuit instead of gain to thereby attenuate higher harmonic signals and to hold the fundamental frequency output from the circuit constant.

The operating characteristics of the automatic low pass filter circuit shown in FIG. 9 is illustrated in FIG. 11 wherein the logarithm to the base 10 of the frequency is plotted as the abcissa and the log of the gain of the circuit is plotted as the ordinate. From this curve it will be seen that for any given fundamental frequency signal within the audio range, the response of the circuit to higher frequencies begins to roll off due to the bandwidth constricting action of FET Q2 so that higher frequency signals such as harmonics are attenuated to a greater extent than the desired fundamental. Consider for example a 90 hertz fundamental frequency signal which is being processed as depicted by the dotted line curve. Due to the rolling off and bandwidth constricting action of FET Q2 as the circuit responds to the 90 hertz signal, the second harmonic 180 hertz and third harmonic 270 hertz signals will be attenuated to a much greater extent than the fundamental 90 hertz signal which is to be processed by the processing portion of the system. By performing this bandwidth constriction and attenuation of higher harmonic content signals in the two automatic low frequency filter stages 76 and 77, greatly improved signal conditioning is achieved. The improved automatic low pass filter consequently eliminates the serious problem encountered with conventional circuits wherein the bandwidth of a preset filter is set substantially below the signal frequency and noise can be passed at a greater amplitude than the signal under conditions where the noise is at a lower frequency than the signal. This improved automatic low pass filter circuit automatically seeks out the lowest frequency, continuously present, major signal while attenuating higher frequency signal components such as second and third harmonics and maintains the level of the desired low frequency signal substantially at the same level as at the output of the automatic gain control amplifier stage.

The output signal from the output of the second stage automatic low pass filter stage is supplied through a 3 kilohertz spike filter R29, C20 connected across the input to the alternate peak detector 78 as shown in FIG. 10. The alternate peak detector 78 is comprised by negative and positive peak detectors, each of which comprises a conventional, commercially available integrated operational amplifier circuit U6 and U5, respectively, interconnected to operate as a peak detector in the manner taught by instruction bulletins distributed by the manufacturers of these circuits. The operational amplifier U6 comprising the negative peak detector has its output connected through a series load resistor R30 and diode D7 across a capacitor C21 to ground. The rectified output voltage appearing across the capacitor C21 is fed back to an inverse input terminal of the operational amplifier U6A in a conventional manner for stabilizing operation of the circuit. The positive peak detector likewise is comprised of a conventional, commercially available, integrated operational amplifier circuit U6B having its output connected through a resistor R31 and diode D8 across a load capacitor C22 with the output voltage appearing across the capacitor C22 being fed back to an inverse input terminal of the operational amplifier U6B. The polarities of the diodes D7 and D8 are reversed relative to each other so that the negative peak voltage appears across C21 and the positive peak voltage appears across C22.

The negative peak voltage and positive peak voltages produced across capacitors C21 and C22, respectively, are connected across a resistor R32 which is connected to the input terminals of a multiplexer U7 which is a conventional, commercially available, integrated circuit structure such as the Motorola MC14053B. Multiplexer U7 operates to connect the voltage appearing across capacitor C21 at test point TP1 which is at the juncture of the diode D7 with capacitor C21 and upper end of resistor R32, alternately to a capacitor C23 that is smaller than the capacitors C21 or C22. On alternate cycles of operation of multiplexer U7, the voltage appearing at test point TP2, which is the juncture of diode D8 with capacitor C22 and the lower end of resistor R32 to capacitor C23, is applied to capacitor C23 by multiplexer U7. During each alternate connection of test points 1 and 2 across the capacitor C23, capacitor C23 will be charged alternately positively and negatively to a percentage of the voltage across capacitors C21 and C22. This percentage is determined by the ratio of the capacitances of C21 and C22 to the capacitance of capacitor C23 and the value of resistor R32. This voltage percentage in effect establishes a threshold voltage value as will be appreciated more fully hereinafter with relation to FIG. 12 of the drawings. As a result, a percentage of both the negative peak voltage and the positive peak voltage alternately will appear across the capacitor C23 and is applied to one input terminal #6 of a comparator circuit U5. U5 comprises a conventional, commercially available integrated operational amplifier circuit such as the T1062CP manufactured and sold by Texas Instrument Corporation, and is interconnected in accordance with the manufacturers' instructions to operate as a comparator circuit. In addition to the percentage of negative and positive peak voltage applied as one input to comparator U5, the actual negative and positive peak voltages are supplied over a conductor 101 from the inputs to the negative and positive peak detectors to a second input terminal #5 of comparator U5.

The operation of the alternate peak detector circuit which is formed by the negative peak detector, the positive peak detector and the comparator circuit U5 is best explained with relation to FIG. 12 of the drawings. As shown in FIG. 12, a generally sinusoidal waveform fundamental frequency input signal is illustrated which has only a single major positive going peak but two major negative going peaks. The peak values are illustrated by amplitude lines indicated as + peak and − peak. Below the + peak and − peak amplitude lines, are the percent of + peak and percent of − peak amplitude values which are produced across the capacitor C23 and alternately supplied to the #6 input terminal of comparator circuit U5. The acutal + peak and − peak voltage values are supplied alternately through conductor 101 to the input terminal #5 of comparator U5. It will be appreciated therefore that the percent of + peak and the percent of − peak voltages across capacitor C23 in actual effect comprise positive and negative threshold voltage values which the actual positive going peak voltage and actual negative going peak voltage values must exceed in order to switch the operation of the comparator circuit U5 from one of its operating conditions to a second different operation condition thereby resulting in a square wave output voltage from comparator U5, such as that illustrated in FIG. 12A, for use by the signal processing portion of the system.

In tracing through the operation of the circuit, as illustrated in FIG. 12, it will be seen that upon the occurrence of the leading or first major positive going peak in the input signal, comparator U5 will be triggered to a first operating state upon the positive going peak voltage exceeding the percent of + peak voltage threshold value and will not be switched to the second different operating state until the first negative going major peak voltage exceeds the percent of negative peak voltage threshold value. Upon this occurrence, the comparator circuit U5 is switched to its second operating state. The occurrence of the minor, positive going peak voltage intermediate the two negative going major peaks will have no effect on the operation of comparator U5 since this minor positive going peak does not exceed the percent of positive peak voltage threshold value. Hence, the comparator U5 will remain in its second operating state while the signal level traverses through the second major negative going peak and then assumes a major positive going value during the next successive major positive peak in the generally sinusoidal waveform signal. Upon the next successive major positive peak value exceeding the percent of positive peak threshold voltage value, the ouput of the comparator U5 again will be switched back to its first operating state at which point one complete period of fundamental frequency signal being analyzed, has occurred. The resultant square wave voltage output signal from the comparator U5 therefore provides a highly reliable and faithful reproduction of the fundamental frequency of the sound wave being analyzed.

Referring back to FIG. 7 of the drawings, it will be seen that the square wave-shaped signal appearing at the output of the comparator U5 is supplied to the input of the micro computer 16 where it will be processed in substantially the same manner as described earlier with relation to FIG. 5 and the desired information displayed on the display 18. While the instrumentalist, vocalist, or other musician employing the system may be required from time to time to operate different input-output switches controlling the type of data displayed, as was explained more fully with relation to FIG. 5, in using the system of FIG. 7, the input or sound signal sensing and detecting portion of the circuit can be operated in a completely hands-off manner with the notable exception of the low/normal range switch 73 which can be adjusted in advance. There is no requirement that the performer remove his hands from the instrument he is playing and adjust the bandpass characteristic of one of the filters, for example, since the automatic gain control amplifier and two stages of automatic low pass filtering automatically will adjust the response of the system to follow changes in notes being played over the entire operating range of the system or to changes in tonal effect being attempted by the performer. This feature provides a considerable advantage over known prior art systems.

Industrial Applicability

From the foregoing description, it will be appreciated that the invention provides a novel sound pitch detection method and system which includes an automatically operated sound pitch detector together with a micro computer and display for use by individual musicians, students, instructors and manufacturers or tuners of instruments and can be used in conjunction with a widely varying number of musical instruments such as woodwinds, brasses, pianos, harps, guitars, violins, percussion type instruments and human voice as well. The novel system can be used for self-analysis, practice training and instrument tuning purposes. The system simply listens to sound produced by the musician and then automatically detects the fundamental frequency of a note being played and displays its value in a format which will best assist the musician in his further practice, training, calibration or tuning of the instrument.

Having described two different embodiments of a novel sound pitch automatic detection and display system constructed in accordance with the invention, other modifications, variations and changes will be suggested to those skilled in the art in the light of the above teachings. It is therefore to be understood that any such variations and changes in the disclosed embodiments of the invention are believed to come within the scope of the present invention as defined by the appended claims.

We claim:

1. A sound pitch automatic detection circuit comprising:

(a) sound signal transducer means responsive to a sound signal in the form of a note being played or voiced for converting the sound signal to an electrical signal having corresponding audio frequency characteristics and a generally sinusoidally varying waveshape;

(b) amplifier means having audio frequency bandpass characteristics compatible with the sound signal frequency spectrum over which the sound signal extends and for amplifying the electrical signals derived by said transducer means;

(c) alternate positive polarity and negative polarity peak voltage detector means continuously responsive to the output from said amplifier means for detecting the first major positive going peak voltage and the first major negative going peak voltage which exceed respective positive and negative threshold voltage values and occurring in each fundamental period of the generally sinusoidally varying waveshape electric signal; and (d) output circuit means responsive to the output from said alternate positive polarity and negative polarity peak voltage detector means for deriving an output electric signal representative of the fundamental frequency of the sound signal.

2. A sound pitch automatic detection circuit according to claim 1 wherein said circuit further includes filter means connected in said circuit to pass only a desired portion of the audio spectrum to said alternate positive polarity and negative polarity peak voltage detector means.

3. A sound pitch automatic detection and display system comprising a sound pitch automatic detection circuit according to claim 1 further including:

(f) computation circuit means responsive to the output from said output circuit means for measuring the elapsed time required to derive an integral number of cycles of the fundamental frequency output signal from said output circuit means and for dividing the integral number of cycles by the elapsed time to thereby obtain an indication of the value of the fundamental frequency of the note being played or voiced; and (f) display means responsive to the output from said computation circuit means for automatically providing an indication of the note being played or voiced to the user of the system.

4. A sound pitch automatic detection and display system comprising a sound pitch automatic detection circuit according to claim 2 further including:

(f) computation circuit means responsive to the output from said output circuit means for measuring the elapsed time required to derive an integral number of cycles of the fundamental frequency output signal from said output circuit means and for dividing the integral number of cycles by the elapsed time to thereby obtain a frequency signal that is indicative of the value of the fundamental frequency of the sound signal being analyzed; and (g) display means responsive to the output from said computation circuit means for automatically providing an indication of the note being played or voiced to a user of the system.

5. A sound pitch automatic detection and display system according to claim 3 wherein said computation circuit means further includes:

(g) means for sequentially computating several measured values of the fundamental frequency of the sound signal being analyzed;

(h) measured frequency memory means for storing the several computed fundamental frequency values of the sound signal being analyzed;

(i) first comparator means responsive to the measured frequency memory means for comparing several computed measured values of the fundamental frequency for correspondence to determine that they all lie in about the same range plus or minus a given tolerance; and (j) display gate circuit means responsive to the first comparator means for automatically gating out an indication of the note being played or voiced to the display means in response to correspondence between several computed measured values within the acceptable tolerances.

6. A sound pitch automatic detection and display system according to claim 4 wherein said computation circuit means further includes:

(h) means for sequentially computing several measured values of the fundamental frequency of the sound signal being analyzed;

(i) measured frequency memory means for storing the several computed fundamental frequency measured values;

(j) first comparator means responsive to the measured frequency memory means for comparing several computed measured values of the fundamental frequency for correspondence to determine that they all lie in about the same range plus or minus a given tolerance; and (k) display gate circuit means responsive to the first comparator means for automatically gating out an indication of the note being played or voiced to the display means in response to correspondence between several computed measured values within the acceptable tolerances.

7. A sound pitch automatic detection and display system according to claim 3 wherein said computation circuit means further includes:

(k) musical note memory means having the frequency values of recognized musical notes comprising the musical scale stored therein;

(l) means responsive to said musical note memory means and to the computed measured value of the fundamental frequency of the sound wave being analyzed for deriving an output difference signal representative of the difference in frequency between the sound signal being analyzed and the nearest recognized note in the musical scale; and (m) said display means also being responsive to the output difference signal for automatically providing an indication of the difference in frequency between the nearest recognized musical note and the computed measured frequency value of the note being played or voiced.

8. A sound pitch automatic detection and display system according to claim 6 wherein said computation circuit means further includes:

(k) musical note memory means having the frequency values of recognized musical notes comprising the musical scale stored therein;

(l) means responsive to said musical note memory means and to the computed measured value of the fundamental frequency of the sound wave being analyzed for deriving an output difference signal representative of the difference in frequency between the sound signal being analyzed and the nearest recognized note in the musical scale; and (m) said display gate circuit means also being responsive to the output difference signal for automatically providing an indication of the difference in frequency between the nearest recognized musical note and the computed measured frequency value of the note being played or voiced.

9. A sound pitch automatic detection and display system according to claim 3 wherein said computation circuit means further includes:

(h) measured frequency memory means for storing the computed measured values of the fundamental frequency of the sound signal being analyzed;

(k) musical note memory means having the frequency values of recognized notes comprising the musical scale stored therein;

(n) relative calibration factor computation and memory circuit means responsive to the measured frequency memory means and to the musical note memory means for dividing the frequency value of the nearest recognized musical note by the stored computed measured value of the fundamental frequency of the sound signal being analyzed to derive and store in a memory a relative calibration factor equal to their quotient;

(o) selectively operand relative calibration multiplier means for selectively multiplying subsequent computed measured fundamental frequency values of a sound signal being analyzed by said relative calibration factor; and (m) said display gate circuit means also being responsive to the output from said relative calibration multiplier means for automatically providing an indication to a user of the system of the resultant product frequency value as representative of the note being played or voiced.

10. A sound pitch automatic detection and display system according to claim 8 further including:

(n) relative calibration factor computation and memory circuit means responsive to the measured frequency memory means and to the musical note memory means for dividing the frequency value of the nearest recognized musical note by the stored measured value of the fundamental frequency of the sound signal being analyzed to derive and store in a memory relative calibration factor equal to their quotient; and (o) selectively operated relative calibration multiplier means for selectively multiplying subsequent computed measured fundamental frequency values of a sound signal being analyzed by said relative calibration factor; and (m) said display gate circuit means also being responsive to the output from said relative calibration multiplier means for automatically providing an indicative of the resulting product frequency value as representative of the note being played or voiced.

11. A sound pitch automatic detection and display system according to either of claims 3, 4, 5, 6, 7, 8, 9 or 10, further including:

(p) key select means selectively operable by an operator of the system and coupled to and controlling operation of said computation circuit means for identifying to the computation circuit means the key of an instrument being used in a practice session which corresponds to the key of C on the concert scale for calibration purposes.

12. A sound pitch automatic detection circuit according to claim 2 wherein said filter means includes at least one automatically adjustable low pass filter means and said amplifier means includes at least one automatic gain controlled amplifier means preceding the adjustable low pass filter means for supplying a substantially constant amplitude signal to the low pass filter means, said automatically adjustable low pass filter means serving automatically to lower the frequency response characteristic thereof to eliminate higher frequency components of a signal being processed until the output signal amplitude therefrom reaches a predetermined level set by the automatic gain control amplifier means at which point further lowering of the frequency responses of the circuit ceases, the output from said low pass filter means being supplied to said alternate peak detector means.

13. A sound pitch automatic detection circuit according to claim 12 wherein there are two stages of automatically adjustable low pass filter means in succession following the automatic gain controlled amplifier means and preceding the alternate peak detector means.

14. A sound pitch automatic detection circuit according to claim 12 wherein the filter means further includes high pass filter means preceding the automatic gain controlled amplifier means.

15. A sound pitch automatic detection circuit according to claim 14 wherein there are two stages of automatically adjustable low pass filter means in succession following the automatic gain controlled amplifier means and preceding the alternate peak detector means.

16. A sound pitch automatic detection and display system comprising a sound pitch automatic detection circuit according to claim 12 further including:

(f) computation circuit means responsive to the output from said output circuit means for measuring the elapsed time required to derive an integral number of cycles of the fundamental frequency output signal from said output circuit means and for dividing the integral number of cycles by the elapsed time to thereby obtain an indication of the value of the fundamental frequency of the sound signal being analyzed; and (g) display means responsive to the output from said computation circuit means for automatically providing an indication of the note being played or voiced to a user of the system.

17. A sound pitch automatic detection and display system comprising a sound pitch automatic detection circuit according to claim 15 further including:

(f) computation circuit means responsive to the output from said output circuit means for measuring the elapsed time required to derive an integral number of cycles of the fundamental frequency output signal from said output circuit means and for dividing the integral number of cycles by the elapsed time to thereby obtain an indication of the value of the fundamental frequency of the sound signal being analyzed; and (g) display means responsive to the output from said computation circuit means for automatically providing an indication of the note being played or voiced to a user of the system.

18. A sound pitch automatic detection and display system according to claim 16 wherein said computation circuit means further includes:

(g) means for sequentially computing several measured values of the fundamental frequency of the sound signal being analyzed;

(h) measured frequency memory means for storing the several computed fundamental frequency measured values;

(i) first comparator means responsive to the measured frequency memory means for comparing several computed measured values of the fundamental frequency for correspondence to determine that they all lie in about the same range plus or minus a given tolerance; and (j) display gate circuit means responsive to the first comparator means for automatically gating out an indication of the note being played or voiced to the display means in response to correspondence between several computed measured values within the acceptable tolerances.

19. A sound pitch automatic detection and display system according to claim 17 wherein said computation circuit means further includes:

(g) means for sequentially computing several measured values of the fundamental frequency of the sound signal being analyzed;

(h) measured frequency memory means for storing the several computed fundamental frequency measured values;

(i) first comparator means responsive to the measured frequency memory means for comparing several computed measured values of the fundamental frequency for correspondence to determine that they all lie in about the same range plus or minus a given tolerance; and (j) display gate circuit means responsive to the first comparator means for automatically gating out an indication of the note being played or voiced to the display means in response to correspondence between several computed measured values within the acceptable tolerances.

20. A sound pitch automatic detection and display system according to claim 18 wherein said computation circuit means further includes:

(k) musical note memory means having the frequency values of recognized musical notes comprising the musical scale stored therein:

(l) means responsive to said musical note memory means and to the computed measured value of the fundamental frequency of the sound wave being analyzed for deriving an output difference signal representative of the difference in frequency between the sound signal being analyzed and the nearest recognized note in the musical scale; and (m) said display means also being responsive to the output difference signal for automatically providing an indication of the difference in frequency between the nearest recognized musical note and the computed measured frequency value of the note being played or voiced.

21. A sound pitch automatic detection and display system according to claim 19 wherein said computation circuit means further includes:

(k) musical note memory means having the frequency values of recognized musical notes comprising the musical scale stored therein;

(l) means responsive to said musical note memory means and to the computed measured value of the fundamental frequency of the sound wave being analyzed for deriving an output difference signal representative of the difference in frequency between the sound signal being analyzed and the nearest recognized note in the musical scale; and (m) said display means also being responsive to the output difference signal for automatically providing an indication of the difference in frequency between the nearest recognized musical note and the computed measured frequency value of the note being played or voiced.

22. A sound pitch automatic detection and display system according to claim 20 further including:

(n) relative calibration factor computation and memory circuit means responsive to the measured frequency memory means and to the musical note memory means for dividing the frequency value of the nearest recognized musical note by the stored measured value of the fundamental frequency of the sound signal being analyzed to derive and store in a memory a relative calibration factor equal to their quotient; and (o) selectively operated relative calibration multiplier means for selectively multiplying subsequent computed measured fundamental frequency values of a sound signal being analyzed by said relative calibration factor; and (m) said display means being responsive to the output from said relative calibration multiplier means for automatically providing an indication of the resultant product frequency value as representative of the note being played or voiced.

23. A sound pitch automatic detection and display system according to claim 21 further including:

(n) relative calibration factor computation and memory circuit means responsive to the measured frequency memory means and to the musical note memory means for dividing the frequency value of the nearest recognized musical note by the stored measured value of the fundamental frequency of the sound signal being analyzed to derive and store in a memory a relative calibration factor equal to their quotient; and (o) selectively operated relative calibration multiplier means for selectively multiplying subsequent computed measured fundamental frequency values of a sound signal being analyzed by said relative calibration factor; and (m) said display means being responsive to the output from said relative calibration multiplier means for automtically providing an indication of the resultant product frequency value as representative of the note being played or voiced.

24. A sound pitch automatic detection and display system according to claim 22 further including:

(p) key select means selectively operable by an operator of the system and coupled to and controlling operation of said computation circuit means for identifying to the computation circuit means the key of an instrument being used in a practice session which corresponds to the key of C on the concert scale for calibration purposes.

25. A sound pitch automatic detection and display system according to claim 23 further including:

(p) key select means selectively operable by an operator of the system and coupled to and controlling operation of said computation circuit means for identifying to the computation circuit means the key of an instrument being used in a practice session which corresponds to the key of C on the concert scale for calibration purposes; and (g) key advance means selectively operated by an operator of the system and coupled to said computation circuit means for selectively advancing the key set by said key select means by at least one half tone for each actuation of the key advance means.

26. A method for automatically detecting the fundamental frequency of a sound signal to be analyzed comprising:

(a) converting a sound signal to be analyzed to an electric signal having corresponding frequency characteristics and a generally sinusoidally varying waveshape;

(b) filtering the audio frequency electric signal to derive an output signal whose frequency characteristics correspond to the fundamental frequency of the sound signal being analyzed;

(c) continuously detecting the first major positive going peak and the first major negative going peak which exceed respective positive and negative threshold voltage values and which occur in each fundamental period of the generally sinusoidally varying waveshape electric signals; and (d) deriving from the output of the alternate positive and negative going peak voltages an output electric signal representative of the fundamental frequency of the sound signal being analyzed.

27. The method according to claim 26 further characterized in automatically controlling gain of the audio frequency electric signal being processed and thereafter automatically adjusting the frequency response characteristic downwardly to eliminate higher frequency components of a signal being processed until the output signal amplitude starts to drop below the level set in the preceding automatic gain controlling operation and thereafter supplying the signal thus gain controlled and frequency reduced to the alternate peak detection operation.

28. The method according to claim 27 wherein the automatic low frequency filtering is accomplished in two successive stages and further comprising high pass filtering the signal being processed in advance of the automatic gain control processing.

29. The method for automatically detecting the fundamental frequency of a sound signal and displaying the results in a desired format according to claim 26; said method further comprising:

(f) measuring the elapsed time required to derive an integral number of cycles of the fundamental frequency output signal;

(g) dividing the integral number of cycles by the elapsed time to thereby obtain a frequency value representative of the fundamental frequency of the sound signal being analyzed; and (h) displaying the results of the computation whereby the fundamental frequency value of a note being played or voiced can be readily determined by the operator.

30. The method according to claim 29 further comprising:

(i) sequentially computing several measured values of the fundamental frequency of the sound signal being analyzed;

(j) storing the several computed fundamental frequency measured values;

(k) comparing the several computed measured frequency values of the fundamental frequency for correspondence to determine that they all lie in about the same range plus or minus a given tolerance; and (l) displaying the closest note to the computed measured fundamental frequency value in response to the occurrence of correspondence in the several measurements being compared.

31. The method according to claim 30 further comprising storing the frequency values of recognized musical notes comprising the musical scale;

(m) comparing the stored values of the recognized musical notes to the fundamental frequency of a sound wave being analyzed and deriving an output difference signal representative of any difference in frequency between the fundamental frequency of the sound wave being analyzed and the nearest recognized note in the musical scale; and (n) providing an indication of the difference in frequency between the nearest recognized musical note and the computed measured frequency value of the sound signal being analyzed.

32. The method of claim 31 further comprising:

(o) dividing the frequency value of the sound signal by the frequency of the nearest recognized musical note to derive a relative calibration factor equal to their quotient;

(p) storing the relative calibration factor in a memory;

(q) selectively multiplying the subsequent computed measured values of the fundamental frequency of a sound signal being analyzed by said relative calibration factor; and (r) displaying the results of the multiplication for viewing by an operator of the method.

33. The method according to claim 32 further comprising selectively comprising the frequency value of a sound signal being analyzed to the frequency values of the notes comprising the musical scale; and (s) displaying to an operator of the method the identification of the note closest to the computed measured value of the fundamental frequency of the sound signal being analyzed.

34. The method according to claim 29 further characterized in automatically controlling gain of the audio frequency electric signal being processed to maintain the amplitude thereof substantially constant and thereafter automatically adjusting the frequency response characteristic downwardly by automatic low frequency filtering to eliminate high frequency components of a signal being processed until the output signal amplitude starts to drop below the level set in the preceding automatic gain controlling operation and thereafter supplying the signal thus gain controlled and frequency reduced to the alternate peak detection processing.

35. The method according to claim 34 wherein the automatic low frequency filtering is accomplished in two successive stages and further comprising high pass filtering the signal being processed in advance of the automatic gain control processing.

36. The method of processing a signal to be analyzed by a signal detection circuit which comprises automatically gain controlling the signal and thereafter automatically adjusting the frequency response characteristics of a low pass filter to lower the frequency response of the filter and thereby eliminate higher frequency components until such time that the output signal amplitude starts to drop below the level set by the automatic gain control operation.

37. The method according to claim 36 further comprising high pass filtering the signal being processed in advance of automatically gain controlling the signal.

38. The method according to claim 37 further comprising low pass filtering the signal being processed in two successive low pass filtering operations.

* * * * *